United States Patent
Liu et al.

(10) Patent No.: US 10,155,586 B2
(45) Date of Patent: Dec. 18, 2018

(54) REMOTELY SUPPLIED POWER FOR UNMANNED AERIAL VEHICLE

(71) Applicant: Facebook, Inc., Menlo Park, CA (US)

(72) Inventors: Zhang Liu, Oak Park, CA (US); Chien-Chung Chen, Thousand Oaks, CA (US)

(73) Assignee: Facebook, Inc., Menlo Park, CA (US)

( * ) Notice: Subject to any disclaimer, the term of this patent is extended or adjusted under 35 U.S.C. 154(b) by 112 days.

(21) Appl. No.: 14/982,648

(22) Filed: Dec. 29, 2015

(65) Prior Publication Data

US 2017/0183095 A1 Jun. 29, 2017

(51) Int. Cl.

| | |
|---|---|
| *H02S 20/20* | (2014.01) |
| *B64C 39/02* | (2006.01) |
| *B60L 11/18* | (2006.01) |
| *B60L 8/00* | (2006.01) |
| *H02S 20/30* | (2014.01) |
| *H02S 40/38* | (2014.01) |
| *H02J 50/30* | (2016.01) |

(52) U.S. Cl.
CPC ............ *B64C 39/024* (2013.01); *B60L 8/003* (2013.01); *B60L 11/1835* (2013.01); *B60L 11/1838* (2013.01); *H02J 50/30* (2016.02); *H02S 20/30* (2014.12); *H02S 40/38* (2014.12); *B60L 2200/10* (2013.01); *B64C 2201/042* (2013.01); *B64C 2201/066* (2013.01); *B64D 2211/00* (2013.01)

(58) Field of Classification Search
CPC .......... H02S 20/20; H02S 20/30; H02S 20/32; H02J 50/30
See application file for complete search history.

(56) References Cited

U.S. PATENT DOCUMENTS

| | | |
|---|---|---|
| 6,407,535 B1 | 6/2002 | Friedman |
| 2002/0046763 A1 | 4/2002 | Berrios |
| 2005/0103943 A1 | 5/2005 | Tanielian |
| 2008/0275572 A1 | 11/2008 | Tillotson |
| 2015/0021442 A1 | 1/2015 | Hunter |
| 2015/0256123 A1 | 9/2015 | Ahn |
| 2015/0311755 A1 | 10/2015 | Hiebl |
| 2016/0049831 A1* | 2/2016 | Nakano .................. H02J 17/00 307/104 |

FOREIGN PATENT DOCUMENTS

CN 204408031 U 6/2015

OTHER PUBLICATIONS

PCT International Search Report and Written Opinion for Application No. PCT/US2015/068033, dated Sep. 29, 2016.

(Continued)

*Primary Examiner* — An Luu
(74) *Attorney, Agent, or Firm* — Baker Botts L.L.P.

(57) ABSTRACT

In one embodiment, a system includes a laser configured to generate a laser beam and a laser-aiming module configured to aim the laser beam to be at least in part incident on a remotely located, continuously moving solar cell. The system also includes a controller configured to receive a feedback signal indicating a position of the laser beam relative to the remotely located, continuously moving solar cell and instruct the laser-aiming module to adjust the aiming of the laser beam based on the feedback signal.

20 Claims, 4 Drawing Sheets

(56) References Cited

OTHER PUBLICATIONS

Extended European Search Report for EP Application No. 16205453.0/1802, dated May 15, 2017.
Nugent, T.J. and Kare, J.T., "Laser Power for UAVs" LaserMotive [online], Mar. 2010, [retrieved on Oct. 6, 2015]. Retrieved from the Internet: <URL: http://lasermotive.com/wp-content/uploads/2010/04/Wireless-Power-for-UAVs-March 2010.pdf>.
EP Communication received from EPO for EP16205453.0-1204, dated Jun. 26, 2018.

* cited by examiner

REMOTELY SUPPLIED POWER FOR UNMANNED AERIAL VEHICLE

TECHNICAL FIELD

This disclosure generally relates to unmanned aerial vehicles.

BACKGROUND

An unmanned aerial vehicle (UAV) may provide wireless Internet connectivity to devices located on the ground. For example, a UAV may have an onboard communications module that wirelessly connects to the Internet (e.g., through a ground-based antenna), and a mobile computing device—such as a smartphone, tablet computer, or laptop computer—may wirelessly connect to the Internet through the UAV's communications module. A UAV may remain aloft for weeks, month, or years, and the UAV may provide access to the Internet and various data services (e.g., messaging, email, voice communication, social networking, search functions, health information, or weather information) to users located in a terrestrial area below the UAV.

SUMMARY OF PARTICULAR EMBODIMENTS

In particular embodiments, a UAV may receive remotely supplied power from a laser system. As an example and not by way of limitation, a ground-based laser system may aim a laser beam to be at least partially incident on a solar cell of a UAV. In particular embodiments, the solar cell may produce supplemental electrical power which may be used to charge a rechargeable battery or to supply power to electronic devices (e.g., a communications module or a propulsion system) of a UAV. As an example and not by way of limitation, a UAV may operate during daylight hours using solar power produced by one or more solar cells which may be attached to an upward facing surface of the UAV. Additionally, excess power produced by the solar cells may be used to charge a rechargeable battery, and during night-time hours, the UAV may be supplied with power from the rechargeable battery. During longer winter nights, the battery may not have sufficient stored energy to provide power to the UAV throughout the night. A remote laser system may aim a laser beam at a downward-facing solar cell of the UAV, and the solar cell may produce supplemental power so that the UAV may operate throughout the night. The UAV may be remotely located and continuously moving with respect to the laser system (e.g., the UAV may be flying above the laser system at a particular altitude), and the aiming of the laser beam may be adjusted to follow the motion of the UAV using a laser-aiming module. Additionally, the laser system may receive a feedback signal and instruct the laser-aiming module to adjust the aiming of the laser based on the feedback signal. As an example and not by way of limitation, the feedback signal may include information received from the UAV indicating a position of the laser beam relative to the solar cell (e.g., an amount of voltage, current, or power produced by the solar cell). As another example and not by way of limitation, the feedback signal may include an image captured by a camera, the image showing the solar cell and the laser beam incident on the solar cell.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
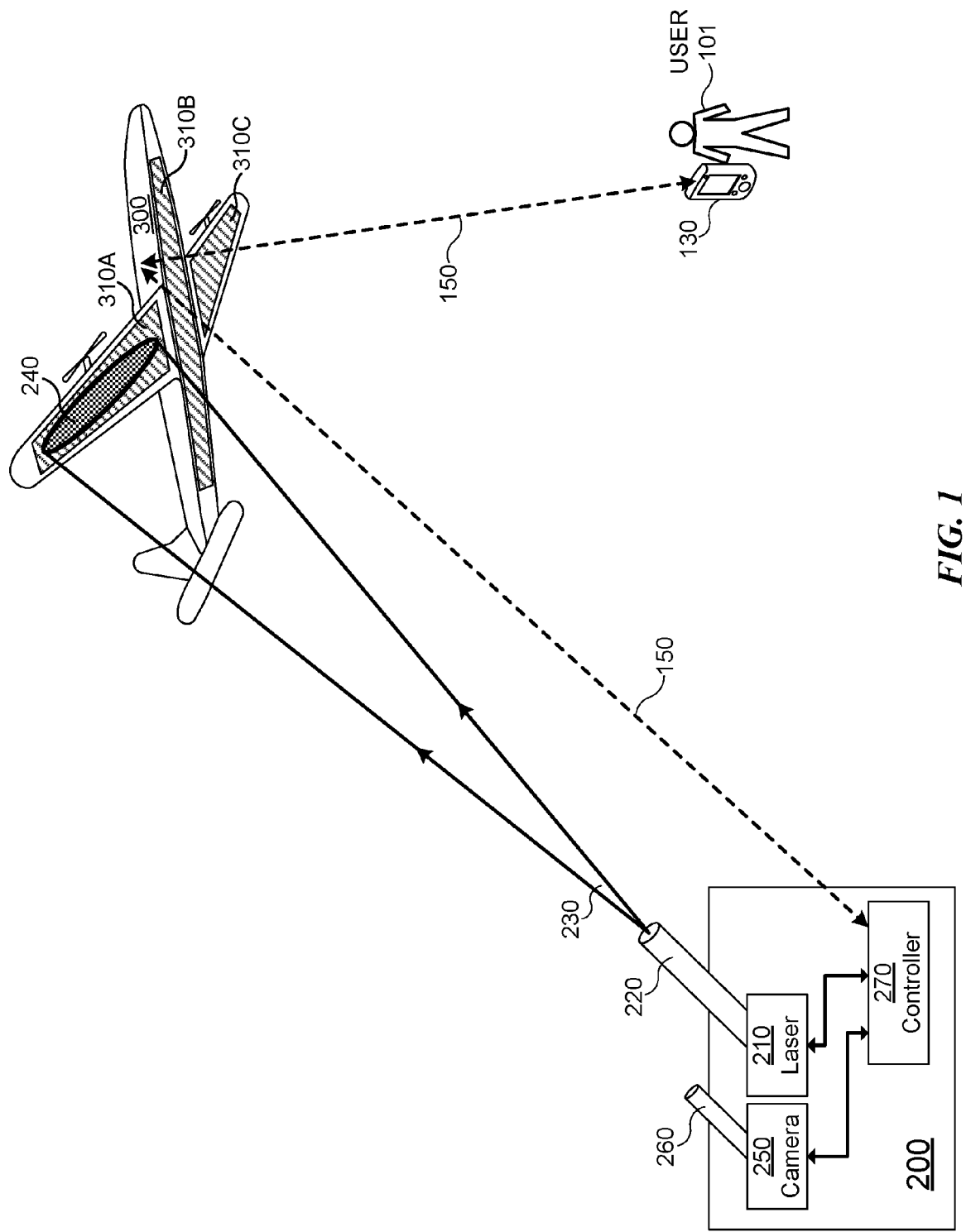
FIG. 1 illustrates an example laser system and an example unmanned aerial vehicle (UAV).

FIG. 1 illustrates an example laser system 200 and an example unmanned aerial vehicle (UAV) 300. In particular embodiments, laser system 200 may be configured to remotely supply power to UAV 300. In particular embodiments, UAV 300 may be referred to as a drone, a remotely piloted aircraft, or an autonomous aircraft. In particular embodiments, UAV 300 may provide wireless connectivity, through one or more links 150, to a network. In particular embodiments, a network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. This disclosure contemplates any suitable links 150. In particular embodiments, one or more links 150 may include one or more wireline (such as for example Digital Subscriber Line (DSL) or Data Over Cable Service Interface Specification (DOCSIS)), wireless (such as for example cellular, radio, Wi-Fi, or Worldwide Interoperability for Microwave Access (WiMAX)), or optical (such as for example free-space optical (FSO), Synchronous Optical Network (SONET) or Synchronous Digital Hierarchy (SDH)) links. As an example and not by way of limitation, wireless link 150 in FIG. 1 connecting user 101 and UAV 300 may be a cellular or radio link. As another example and not by way of limitation, wireless link 150 in FIG. 1 connecting UAV 300 and controller 270 may be a cellular, radio, or FSO link. In particular embodiments, one or more links 150 may each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network. One or more first links 150 may differ in one or more respects from one or more second links 150.

In particular embodiments, one or more links 150 may connect client system 130 to UAV 300, and one or more other links 150 may connect controller 270 to UAV 300. Additionally, one or more links 150 (not illustrated in FIG. 1) may connect UAV 300 to a network. As an example and not by way of limitation, UAV 300 may connect to a ground-based antenna via a wireless link 150, and the antenna may in turn connect to the Internet through one or more other links 150. In particular embodiments, a user 101 may access the Internet on a client system 130 through one or more links 150 provided by UAV 300. As an example and not by way of limitation, client system 130 may connect to UAV 300 via a wireless link 150 (e.g., a cellular or radio link), and then, through UAV 300, client system 130 may connect to the Internet via one or more other links 150 (e.g., via a link to a ground-based antenna, which is in turn connected to the Internet). In particular embodiments, user 101 may be an individual (human user), an entity (e.g., an enterprise, business, or third-party application), or a group (e.g., of individuals or entities) that interacts or communicates, at least in part, by a link 150 provided by UAV 300. In particular embodiments, client system 130 may be any suitable computing device, such as, for example, a personal computer, a laptop computer, a cellular telephone, a smartphone, a tablet computer, or an augmented/virtual reality device. Although this disclosure describes and illustrates particular client systems accessing particular networks via particular links, this disclosure contemplates any suitable client systems accessing any suitable networks via any suitable links.

In particular embodiments, laser system 200 may include laser 210. In particular embodiments, laser 210 may be part of a system to remotely supply power to UAV 300. In particular embodiments, laser 210 may include a solid-state laser, such as for example, a neodymium-doped yttrium aluminum garnet laser (Nd:YAG laser), a neodymium-doped glass laser (Nd:glass laser), a ytterbium-doped glass laser (Yb:glass laser), or a ytterbium-doped ceramic laser. As an example and not by way of limitation, laser 210 may include a continuous-wave (CW) Nd:YAG laser operating at an optical wavelength of approximately 1.064 µm. As another example and not by way of limitation, laser 210 may include a frequency-doubled Nd:YAG laser operating at a wavelength of approximately 532 nm. As another example and not by way of limitation, laser 210 may include a Yb:glass fiber laser operating at a wavelength of approximately 1.03 µm. In particular embodiments, laser 210 may include a semiconductor laser. As an example and not by way of limitation, laser 210 may include an array of two or more aluminum-gallium-arsenide (AlGaAs) laser diodes operating at wavelengths within a range of approximately 0.7 µm to approximately 0.9 µm. As another example and not by way of limitation, laser 210 may include an indium-gallium-arsenide-phosphide (InGaAsP) laser diode operating at a wavelength within a range of approximately 1.0 to 1.6 µm. In particular embodiments, laser 210 may have a wavelength within a range of approximately 0.5 µm to approximately 2.0 µm. As an example and not by way of limitation, laser 210 may have an output wavelength of approximately 0.7 µm, 0.8 µm, 0.9 µm, 1.0 µm, 1.1 µm, or any suitable output wavelength. In particular embodiments, laser 210 may include two or more lasers configured to operate at two or more wavelengths. As an example and not by way of limitation, laser 210 may include a CW AlGaAs laser diode configured to operate at approximately 0.85 µm and a CW InGaAsP laser diode configured to operate at approximately 1.05 µm. The beams from the two lasers may be combined together into a single laser beam 230. Although this disclosure describes and illustrates particular lasers having particular wavelengths, this disclosure contemplates any suitable lasers having any suitable wavelengths.

In particular embodiments, laser 210 may have an average output optical power within a range of approximately 500 watts to approximately 10,000 watts. As an example and not by way of limitation, laser 210 may be configured to generate laser beam 230, where laser beam 230 is a free-space laser beam having an average optical power of 500 watts, 2,000 watts, 4,000 watts, or any suitable optical power. In particular embodiments, laser 210 may include a CW laser with an average output power of 1,000-2,000 watts. As an example and not by way of limitation, laser 210 may include a Yb:glass fiber laser with an output power of approximately 1,500 watts. As another example and not by way of limitation, laser 210 may include a high-power invisible laser (e.g., a 1,000-watt laser operating at approximately 1.0 µm) combined to co-propagate with a moderate-power visible laser (e.g., a one-watt laser operating at approximately 0.50-0.65 µm). The high-power invisible laser may be used to provide power to a remotely located solar cell, and the moderate-power visible laser may be used for aiming purposes (e.g., a camera may image the visible laser and solar cell 310A to provide feedback for aiming the invisible laser beam onto the solar cell). Although this disclosure describes and illustrates particular lasers having particular output powers, this disclosure contemplates any suitable lasers having any suitable output powers.

In particular embodiments, UAV 300 may include one or more solar cells. In the example of FIG. 1, UAV 300 includes three lower solar cells (solar cells 310A, 310B, and 310C). Solar cells 310A, 310B, and 310C are attached to downward-facing surfaces of UAV 300, and when UAV 300 is flying, solar cells 310A, 310B, and 310C are oriented facing down towards the ground. Solar cells 310A, 310B, and 310C may be referred to as downward-facing solar cells. In particular embodiments, UAV 300 may include one or more upper solar cells (not shown in FIG. 1) attached to upward-facing surfaces of UAV 300 and referred to as upward-facing solar cells. When UAV 300 is flying, upward-facing solar cells may be oriented facing up, away from the ground. Although this disclosure describes and illustrates particular unmanned aerial vehicles having particular numbers of solar cells with particular orientations, this disclosure contemplates any suitable unmanned aerial vehicles having any suitable numbers of solar cells with any suitable orientations.

In particular embodiments, laser system 200 may include laser-aiming module 220. As an example and not by way of limitation, laser-aiming module 220 may be configured to aim laser beam 230 to be at least in part incident on a remotely located, continuously moving solar cell. In particular embodiments, a remotely located solar cell 310A may refer to a solar cell that is located a particular distance or within a particular range of distances from laser system 200. As an example and not by way of limitation, solar cell 310A may be remotely located with respect to a ground-based laser system 200, and a distance between solar cell 310A and laser system 200 may be greater than or equal to approximately 1 mile, 2 miles, 5 miles, 10 miles, 15 miles, or any suitable distance or range of distances. As another example and not by way of limitation, remotely located solar cell 310A may be a part of UAV 300 which is flying along a circular flight path above ground-based laser system 200, and the distance between solar cell 310A and laser system 200 may vary between approximately 12 and 13 miles. In particular embodiments, a continuously moving solar cell may refer to a solar cell that is in continuous motion with respect to a stationary, ground-based reference location. As an example and not by way of limitation, when UAV 300 is flying, UAV 300 and solar cells 310A, 310B, and 310B may be in continuous motion with respect to ground-based laser system 200.

In the example of FIG. 1, laser-aiming module 220 is directing laser beam 230 to be at least in part incident on solar cell 310A. In particular embodiments, a laser spot 240 may be produced when laser beam 230 is incident on a surface (e.g., a surface of UAV 300). In particular embodiments, laser beam 230 being at least in part incident on solar cell 310A may refer to a particular percentage (e.g., 10%, 30%, 50%, 80%, 90%, 99%, 100%, or any suitable percentage) of the optical power in laser beam 230 or laser spot 240 being incident on a surface of solar cell 310A. As an example and not by way of limitation, laser-aiming module 220 may aim laser beam 230 so that greater than or equal to 80% of the optical power in laser spot 240 is incident on solar cell 310A. In particular embodiments, all of laser beam 230 may be incident on solar cell 310A (e.g., 100% of laser spot 240 may be contained within an area of solar cell 310A). In particular embodiments, solar cell 310A may be part of UAV 300 which may be in continuous motion, and laser-aiming module 220 may adjust the aiming of laser beam 230 based at least in part on the motion of solar cell 310A. The aiming of laser beam 230 may be adjusted to follow the motion of solar cell 310A with respect to laser system 200 and to keep laser beam 230 at least partially incident on solar cell 310A.

In particular embodiments, laser-aiming module 220 may be configured to receive laser beam 230 generated by laser 210; modify an optical property of laser beam 230; and direct laser beam 230 onto solar cell 310A. The laser beam 230 received from laser 210 may be a free-space beam or a beam contained or guided within a fiber-optic cable. In particular embodiments, laser-aiming module 220 may include a telescope or a reflector, and adjusting the aiming of laser beam 230 may include moving or rotating at least a portion of the telescope or reflector. As an example and not by way of limitation, laser-aiming module 220 may include a fixed telescope and a rotatable reflector. In particular embodiments, a telescope may be referred to as a beam expander or a beam modifier. As used herein, a telescope may refer to an arrangement of optical elements (e.g., lenses, mirrors, or prisms) configured to modify one or more optical properties (e.g., beam size, beam shape, beam divergence, or beam pointing) of a laser beam. A telescope may receive output laser beam 230 from laser 210, and the telescope may modify an optical property of laser beam 230 to produce laser beam 230 having a particular size, shape, or divergence. The telescope may then send laser beam 230 to a reflector (e.g., a planar or concave reflector) which reflects laser beam 230 so that laser spot 240 is at least partially incident on solar cell 310A. The reflector may be motorized to allow its orientation to be changed. Adjusting the aiming of laser beam 230 may include rotating the reflector (e.g., changing to orientation of the reflector) so that laser beam 230 is directed towards or onto solar cell 310A. In particular embodiments, laser-aiming module 220 may include a reflector configured to receive laser beam 230 generated by laser 210 and direct laser beam 230 onto solar cell 310A. As an example and not by way of limitation, laser beam 230 emitted by laser 210 may have a beam size, shape, or divergence suitable for transmitting laser beam 230 to solar cell 310A, and laser-aiming module 220 may include a motorized reflector configured to reflect the laser beam 230 so that it is directed towards or onto solar cell 310A. Although this disclosure describes and illustrates particular laser-aiming modules that include particular optical elements, this disclosure contemplates any suitable laser-aiming modules that include any suitable optical elements.

In particular embodiments, laser-aiming module 220 may be configured to adjust a size or a shape of laser beam 230 to substantially match a size or a shape of solar cell 310A. As an example and not by way of limitation, solar cell 310A may have an approximately rectangular shape, and laser-aiming module 220 may adjust or modify laser beam 230 so that laser spot 240 has a shape that substantially matches the shape of solar cell 310A. In particular embodiments, solar cell 310A or laser spot 240 may have any suitable shape (e.g., a rectangular, square, circular, elliptical, or triangular shape) or any suitable combination of suitable shapes. In particular embodiments, a laser spot 240 that has a shape that substantially matches a shape of solar cell 310A may refer to laser spot 240 having a dimension within a particular percentage of a corresponding dimension of solar cell 310A. As an example and not by way of limitation, laser spot 240, when projected onto solar cell 310A, may have a length or width that is within approximately 5%, 10%, or 20% of a corresponding length or width of solar cell 310A. In particular embodiments, laser beam 230 incident on solar cell 310A may have a diameter that is approximately equal to a length or a width of solar cell 310A. As an example and not by way of limitation, solar cell 310A may have an approximately 2-meter by 2-meter square shape, and laser spot 240 may have an approximately circular shape with a diameter of approximately 2 meters. As another example and not by way of limitation, solar cell 310A may have an approximately 2-meter by 1-meter rectangular shape, and laser spot 240 may have an approximately elliptical shape with a major axis of approximately 2 meters and a minor axis of approximately 1 meter.

In particular embodiments, a dimension of laser spot 240 may be less than a corresponding dimension of solar cell 310A. Having a laser spot 240 that is smaller than solar cell 310A may allow for laser spot 240 to remain aimed onto solar cell 310A even if there are variations in the relative position of laser spot 240 with respect to solar cell 310A (e.g., due to air turbulence). As an example and not by way of limitation, laser spot 240 may have a diameter of approximately 1 meter, and solar cell 310A may have a length or width of approximately 2 meters. As another example and not by way of limitation, laser spot 240 may have a dimension that is approximately 40%, 60%, or 80% of a corresponding dimension of solar cell 310A. Although this disclosure describes and illustrates particular laser beams and particular solar cells having particular shapes and sizes, this disclosure contemplates any suitable laser beams and any suitable solar cells having any suitable shapes and sizes.

Figure 2:
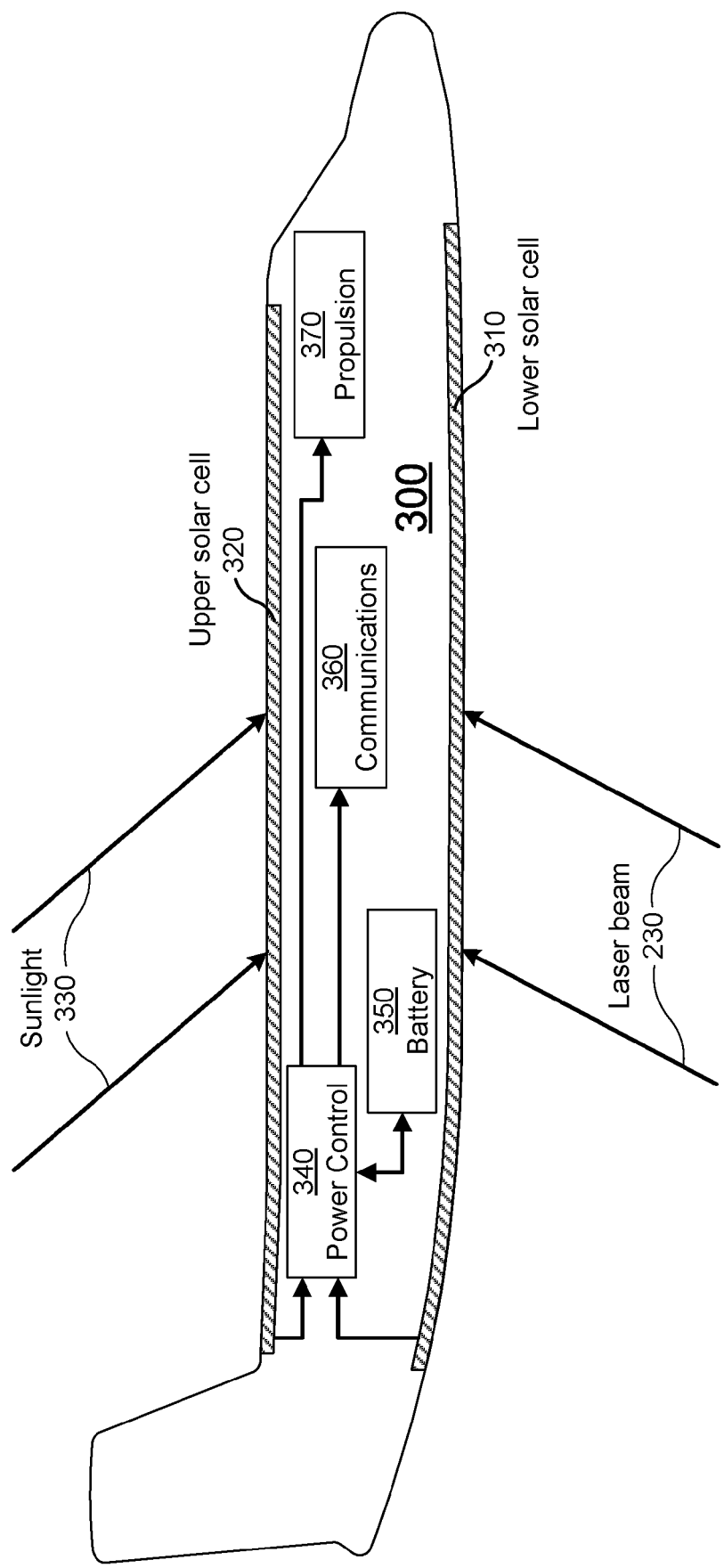
FIG. 2 illustrates a block diagram of an example unmanned aerial vehicle.

FIG. 2 illustrates a block diagram of an example unmanned aerial vehicle 300. In particular embodiments, UAV 300 may include one or more lower solar cells 310 configured to receive optical power from laser beam 230 and produce supplemental electrical power from the received optical power. As an example and not by way of limitation, when laser beam 230 is incident on lower solar cell 310, lower solar cell 310 may produce approximately 100 to 800 watts of electrical power. In particular embodiments, UAV 300 may include one or more upper solar cells 320 configured to receive sunlight 330 and produce solar-based electrical power from the received sunlight. As an example and not by way of limitation, when sunlight 330 is incident on upper solar cell 310, upper solar cell 310 may produce approximately 500 to 5,000 watts of electrical power. As an example and not by way of limitation, during morning or evening hours when sunlight 330 may strike upper solar cell 310 at an angle, upper solar cell 310 may produce approximately 500 to 1,000 watts of power. Around noon when sunlight 330 may strike upper solar cell 310 at an approximately normal angle of incidence, upper solar cell may produce approximately 4,000 to 5,000 watts of power. Although this disclosure describes and illustrates particular solar cells configured to produce particular amounts of electrical power, this disclosure contemplates any suitable solar cells configured to produce any suitable amounts of electrical power.

In particular embodiments, lower solar cell 310 may be attached to a downward-facing surface of UAV 300, and upper solar cell 320 may be attached to an upward-facing surface of UAV 300. As an example and not by way of limitation, solar cell 310 may be attached to a downward-facing surface of the fuselage, tail, or wings of UAV 300. As another example and not by way of limitation, solar cell 320 may be attached to an upward-facing surface of the fuselage, tail, or wings of UAV 300. In particular embodiments, UAV 300 may include one or more lower solar cells 310. As an example and not by way of limitation, UAV 300 may include one lower solar cell 310 attached to the underside of a wing or the fuselage and having an area of approximately 2 to 4 m$^2$. As another example and not by way of limitation, UAV 300 may include two lower solar cells 310, each solar cell attached to the underside of a wing and each cell having an area of approximately 2 m$^2$. In particular embodiments, lower solar cell 310 or upper solar cell 320 may be attached to any suitable part of UAV 300. As an example and not by way of limitation, lower solar cell 310 or upper solar cell 320 may be attached to any suitable portion of the fuselage, wings, vertical stabilizer, or horizontal stabilizer of UAV 300. Although this disclosure describes and illustrates particular numbers of solar cells attached to particular parts of an unmanned aerial vehicle, this disclosure contemplates any suitable numbers of solar cells attached to any suitable parts of an unmanned aerial vehicle.

In particular embodiments, solar cell 310 or solar cell 320 may be referred to as a photovoltaic cell, solar module, solar panel, or solar array. As an example and not by way of limitation, two or more solar cells 310 may be electrically coupled together to form a solar panel or a solar-cell array, which may also be referred to as a solar cell 310. Similarly, solar cell 310 may be made up of an array of discrete solar cells which are electrically coupled together. In particular embodiments, lower solar cell 310 or upper solar cell 320 may include a polysilicon-based photovoltaic cell, a monocrystalline silicon-based photovoltaic cell, an amorphous silicon-based photovoltaic cell, a thin-film photovoltaic cell, or a gallium arsenide-based photovoltaic cell. In particular embodiments, lower solar cell 310 or upper solar cell 320 may include a multi-junction photovoltaic cell, such as for example, a stack of two or more semiconductor-based photovoltaic cells (e.g., a stack of gallium indium phosphide, gallium arsenide, and germanium photovoltaic cells). Although this disclosure describes and illustrates particular solar cells that include particular materials, this disclosure contemplates any suitable solar cells that include any suitable materials.

In particular embodiments, solar cell 310 may produce electrical power from laser beam 230 incident on the solar cell 310. As an example and not by way of limitation, solar cell 310 may produce approximately 100 to 800 watts of electrical power from incident laser beam 230. As another example, a laser 210 with an optical output power of approximately 1,500 watts may result in approximately 300-400 watts of electrical power generated by solar cell 310. In particular embodiments, $P_E$, the approximate electrical power produced by solar cell 310 from incident laser beam 230 may be expressed as $P_E=(1-L)\cdot C\cdot E\cdot P_O$, where $P_O$ is the optical power of laser beam 230 (as measured at an output of laser 210 or laser-aiming module 220), L is a loss coefficient, C is a coupling coefficient, and E is an optical-to-electrical conversion efficiency of solar cell 310. The loss coefficient L represents a percentage of light that is lost due to scatter or absorption while propagating from laser system 200 to solar cell 310. For example, if 80% of the light in laser beam 230 propagates from laser system 200 to solar cell 310, then the loss coefficient is 20%. The coupling coefficient represents a percentage of laser spot 240 that is incident on solar cell 310. For example, if approximately 90% of laser beam 230 is incident on solar cell 310, then C is 90% (e.g., 10% of the light in laser beam 230 is lost due to misalignment of laser beam 230 with respect to solar cell 310). In particular embodiments, the efficiency of solar cell 310 may be in a range of approximately 10% to 40%. As an example and not by way of limitation, for a laser beam 230 with an output power of 1,500 watts, a loss coefficient L of 20%, a coupling coefficient C of 90%, and a solar-cell efficiency E of 30%, the electrical power produced by solar cell 310 may be approximately $0.8\cdot0.9\cdot0.3\cdot1,500$ W$\cong$324 W. Although this disclosure describes and illustrates particular solar cells configured to produce particular amounts of power from particular laser beams, this disclosure contemplates any suitable solar cells configured to produce any suitable amounts of power from any suitable laser beams.

In particular embodiments, UAV 300 may include a propulsion system 370 configured to maintain UAV 300 aloft. As an example and not by way of limitation, propulsion system 370 may include an electric motor configured to drive a propeller. As another example and not by way of limitation, propulsion system 370 may be configured to maintain UAV 300 in a flight pattern at a particular altitude (e.g., within 10% of 65,000 feet above sea level). Although this disclosure describes and illustrates particular unmanned aerial vehicles having particular propulsion systems, this disclosure contemplates any suitable unmanned aerial vehicles having any suitable propulsion systems.

In particular embodiments, UAV 300 may include a communications module 360. As an example and not by way of limitation, communications module 360 may be configured to wirelessly communicate with controller 270 of laser system 200. Communications module 360 may send information to controller 270, such as for example, battery-status information, navigation or location information, or solar-cell information (e.g., an amount of voltage, current or electrical power that is being produced by solar cell 310 or 320). As another example and not by way of limitation, communications module 360 may provide wireless connectivity to the Internet for client system 130. In particular embodiments, communications module 360 may perform a navigation function. As an example and not by way of limitation, communications module 360 may determine the location of UAV 300 (e.g., using a Global Positioning System (GPS) signal) or may control or adjust the speed, direction, altitude, or flight path of UAV 300. Although this disclosure describes and illustrates particular communications modules configured to perform particular functions, this disclosure contemplates any suitable communications modules configured to perform any suitable functions.

In particular embodiments, UAV 300 may include a rechargeable battery 350. As an example and not by way of limitation, rechargeable battery 350 may be configured to provide operating power to communications module 360 or propulsion system 370. Additionally, rechargeable battery 350 may be configured to receive electrical power for recharging battery 350 from lower solar cell 310 or upper solar cell 320. As an example and not by way of limitation, during daylight hours when sunlight 330 is incident on upper solar cell 320, a portion of power produced by upper solar cell 320 may be sent to battery 350 for recharging battery 350. As used herein, a rechargeable battery 350 may refer to any suitable rechargeable energy storage device, such as for example, a nickel-metal-hydride-based rechargeable battery; a supercapacitor (e.g., a high-capacity electrochemical capacitor); a flow battery (e.g., a rechargeable fuel cell with an electrolyte containing one or more dissolved electroactive elements); or an ultrabattery (e.g., a hybrid lead-acid battery and supercapacitor). In particular embodiments, rechargeable battery 350 may be based on one or more types of electrode materials or electrolytes, such as for example, nickel-metal hydride, nickel-hydrogen, lithium ion, or lithium-ion polymer. Although this disclosure describes and illustrates particular rechargeable batteries having particular electrode materials and particular electrolytes, this disclosure contemplates any suitable rechargeable batteries having any suitable electrode materials and any suitable electrolytes.

In particular embodiments, UAV 300 may include a power controller 340 which directs the flow of electric current or power between the various electronic devices of UAV 300. As an example and not by way of limitation, power controller 340 may couple battery 350 to communications module 360 and propulsion system 370 so that battery 350 provides operating power to communications module 360 and propulsion system 370. As another example and not by way of limitation, power controller 340 may couple lower solar cell 310 or upper solar cell 320 to battery 350, communications module 360, or propulsion system 370 so that electrical power produced by solar cell 310 or 320 charges battery 350 or provides operating power to communications module 360 or propulsion system 370. In particular embodiments, power controller 340 may include one or more switches or current splitters to direct electrical power from solar cells 310 or 320 to battery 350, communications module 360, or propulsion system 370. As an example and not by way of limitation, power controller 340 may be configured to direct a portion of current produced by upper solar cell 320 to communications module 360 and propulsion system 370 and the remainder of current produced by upper solar cell 320 to rechargeable battery 350. As another example and not by way of limitation, power controller 340 may combine current produced by lower solar cell 310 with current from rechargeable battery 350. The combined current from lower solar cell 310 and rechargeable battery 350 may be used to provide power to communications module 360 and propulsion system 370. In particular embodiments, power controller 340 may include a voltage converter to convert a direct-current (DC) voltage produced by solar cell 310 or 320 into a different DC voltage that is provided to battery 350, communications module 360, or propulsion system 370. Although this disclosure describes and illustrates particular power controllers configured to receive power from and provide power to particular electronic devices, this disclosure contemplates any suitable power controllers configured to receive power from and provide power to any suitable electronic devices.

In particular embodiments, power controller 340 may be configured to provide solar-based electrical power to UAV 300, where solar-based electrical power refers to power produced by a solar cell 320 from sunlight 330. As an example and not by way of limitation, during daylight hours when sunlight 330 is incident on upper solar cell 320, power controller 340 may send a portion of the solar-based electric current produced by upper solar cell 320 to battery 350 for charging the battery 350. As another example and not by way of limitation, during daylight hours, power controller 340 may send a portion of electric current produced by upper solar cell 320 to communications module 360 to provide electrical power to communications module 360. Similarly, during daylight hours, power controller 340 may send a portion of electric current produced by upper solar cell 320 to propulsion system 370 to provide electrical power to propulsion system 370. In particular embodiments, power produced by upper solar cell 320 may be used to charge battery 350 and provide power to communications module 360 and propulsion system 370. As an example and not by way of limitation, during daylight hours, upper solar cell 320 may produce between 1,000 and 5,000 watts of electrical power (e.g., around noon when the sun is approximately directly overhead, upper solar cell 320 may produce a maximum amount of power). The power-consuming electronic devices of UAV 300 (e.g., communications module 360 and propulsion system 370) may require approximately 2,500 watts of power, and any excess electrical power produced by upper solar cell 320 may be used to charge battery 350. During morning and evening, upper solar cell 320 may provide approximately 1,000 watts for powering UAV 300, and battery 350 may supply an additional 1,500 watts. Around noon, upper solar cell 320 may produce a total of approximately 5,000 watts. Approximately 2,500 watts of the produced power may be used to power UAV 300, and the excess 2,500 watts produced by upper solar cell 320 may be used to charge battery 350. Although this disclosure describes and illustrates particular electronic devices that consume or produce particular amounts of electrical power, this disclosure contemplates any suitable electronic devices that consume or produce any suitable amounts of electrical power.

In particular embodiments, power controller 340 may be configured to direct or provide supplemental electrical power to UAV 300, where supplemental electrical power refers to power produced by lower solar cell 310. As an example and not by way of limitation, when laser beam 230 is incident on lower solar cell 310, power controller 340 may send a portion of the supplemental electrical power produced by lower solar cell 310 to battery 350 (e.g., for charging the battery 350), to communications module 360 (e.g., to provide electrical power to the communications module 360), or to propulsion system 370 (e.g., to provide electrical power to the propulsion system 370). In particular embodiments, power produced by lower solar cell 310 may be combined with power from battery 350, and the combined power may be used to provide power to communications module 360 and propulsion system 370. As an example and not by way of limitation, during nighttime hours (e.g., when upper solar cell 320 produces approximately no power), power for the electronic devices of UAV 300 may be supplied by battery 350. If battery 350 does not have the capacity to provide power throughout the night, then supplemental power may be supplied by lower solar cell 310. As an example and not by way of limitation, battery 350 may provide 2,000 watts of power and lower solar cell 310 may provide 500 watts of supplemental power.

In particular embodiments, the amount or timing of supplemental power provided by lower solar cell 310 may vary seasonally. As an example and not by way of limitation, during the summertime when daylight hours are relatively long (e.g., 14-16 hours) and nighttime hours are relatively short (e.g., 8-10 hours), battery 350 may store enough energy received from upper solar cell 320 during daylight hours to supply power for UAV 300 throughout the night. During the wintertime when daylight hours are relatively short and nighttime hours are relatively long, battery 350 may not have enough stored energy to supply power to UAV 300 to last throughout the night. When battery 350 is unable to provide power throughout the night, supplemental power may be provided by laser beam 230 directed at lower solar cell 310. Although this disclosure describes and illustrates particular amounts of power supplied by a rechargeable battery and particular amounts of power supplied by a lower solar cell, this disclosure contemplates any suitable amounts of power supplied by a rechargeable battery and any suitable amounts of power supplied by a lower solar cell.

In particular embodiments, UAV 300 may be configured to take off from a ground-based airport or airstrip and climb to a cruising altitude. In particular embodiments, UAV 300 may be configured to be launched into flight by another airplane (e.g., an airplane may tow UAV 300 up to a particular altitude and then release UAV 300 to fly on its own). In particular embodiments, UAV 300 may be configured to fly at a cruising altitude within a range of approximately 3,000 feet to approximately 100,000 feet above sea level. As an example and not by way of limitation, UAV 300 may be configured to fly at an altitude within a range of approximately 40,000 to 80,000 feet above sea level. As another example and not by way of limitation, UAV 300 may be configured to fly at an altitude within a range of approximately 60,000 to 70,000 feet above sea level. In particular embodiments, UAV 300 may be configured to fly within any suitable percentage of a particular altitude. As an example and not by way of limitation, UAV 300 may be configured to fly at an altitude within any suitable percentage of 65,000 feet above sea level (e.g., within 1%, 2%, 5%, 10% of 65,000 feet above sea level). In particular embodiments, UAV 300 may be configured to fly along a particular flight path having a particular size, location, or shape (e.g., circular, figure eight, or elliptical). As an example and not by way of limitation, UAV 300 may be configured to fly along a substantially circular flight path having a diameter of approximately 0.5 miles, 1 mile, 2 miles, 5 miles, or any suitable diameter. As another example and not by way of limitation, UAV 300 may be configured to fly along a flight path that is located substantially above a location of laser system 200. In particular embodiments, UAV 300 may fly autonomously based on flight-path information stored onboard UAV or based on flight-path information received from a ground-based guidance station (which may be located within or near laser station 200). In particular embodiments, UAV 300 may fly autonomously with periodic updates or adjustments to its flight path sent by a ground-based guidance station. As an example and not by way of limitation, controller 270 may send to UAV 300 via link 150 flight-path information or updates or adjustments to the flight path of UAV 300. Although this disclosure describes and illustrates particular unmanned aerial vehicles configured to fly at particular altitudes and along particular flight paths, this disclosure contemplates any suitable unmanned aerial vehicles configured to fly at any suitable altitudes and along any suitable flight paths.

In particular embodiments, laser system 200 may include controller 270 which may control laser-aiming module 220 to adjust the aiming of laser beam 230. As an example and not by way of limitation, controller 270 may send instructions to laser-aiming module 220 to aim laser beam 230 to be at least in part incident on solar cell 310. In particular embodiments, laser beam 230 may be aimed at solar cell 310, and the aiming of laser beam 230 may be adjusted based at least in part on the motion of the UAV 300 (e.g., the UAV 300 flying along a particular flight path). As an example and not by way of limitation, controller 270 may receive location information for UAV 300 sent by communications module 360 (e.g., based on a GPS signal received by communications module 360), and based on the location information, controller 270 may send aiming instructions to laser-aiming module 220. In particular embodiments, controller 270 may be configured to adjust the aiming of laser beam 230 based at least in part on an altitude or a flight path of UAV 300. As an example and not by way of limitation, controller 270 may have information about the altitude or flight path of UAV 300 (e.g., the information may be stored in a memory of controller 270 or received from communications module 360), and based on the altitude or flight-path information, controller 270 may instruct laser-aiming module 220 to adjust the aiming of laser beam 230 to be at least in part incident on solar cell 310. In particular embodiments, controller 270 may be configured to adjust the aiming of laser beam 230 based on flight-path information as well as based on a feedback signal. As an example and not by way of limitation, flight-path information of UAV 300 may be used to determine coarse aiming information for laser-aiming module 230, and a feedback signal may be used to provide fine adjustments to the coarse aiming information to ensure that laser beam 230 remains at least partially incident on solar cell 310. Fine adjustments to the aiming of laser beam 230 may be used, at least in part, to compensate for beam deviation caused by air turbulence encountered along a beam path of laser beam 230 as it propagates from laser-aiming module 220 to solar cell 310.

In particular embodiments, laser-aiming module 220 may be configured to perform a conical scan of laser beam 230 to initially aim laser beam 230 at solar cell 310. As an example and not by way of limitation, when laser 210 is initially activated (e.g., laser 210 may be turned off during the day and turned on during nighttime hours to provide supplemental power to UAV 300) or if laser beam 230 has become misaligned with respect to solar cell 310, a scan of laser beam 230 may be performed to aim laser beam 230 at solar cell 310. In particular embodiments, a conical scan may refer to a circular or spiral angular motion applied to laser beam 230 by laser-aiming module 220. As an example and not by way of limitation, laser-aiming module 220 may initially direct laser beam 230 to an initial aiming location (e.g., based on location information received by controller 270 from communications module 360), and then laser-aiming module 220 may apply a circular scanning motion to laser beam 230 until laser beam 230 is incident on solar cell 310. The circular scanning motion may have a gradually increasing diameter (e.g., laser beam 230 may be scanned in a spiral-type pattern) or the circular scanning motion may gradually translate around the initial aiming location. During a conical scan, controller 270 may receive information from communications module 360 indicating that laser beam 230 was incident on solar cell 310 (e.g., power controller 340 may sense a pulse in current from solar cell 310), and controller 270 may instruct laser-aiming module 220 to aim laser beam 230 in a particular direction based on this information so that laser beam 230 is at least in part incident on solar cell 310. In particular embodiments, during a conical scan, laser beam 230 may have a reduced amount of optical power, and once laser beam 230 is aimed onto solar cell 310, the power in laser beam 230 may be increased. As an example and not by way of limitation, laser beam 230 may be attenuated at laser system 200 (e.g., laser beam 230 may have an optical power of 1 watt, 10 watts, or 100 watts) while a conical scan is being performed. Although this disclosure describes and illustrates particular laser-aiming modules configured to perform particular laser-beam scans, this disclosure contemplates any suitable laser-aiming modules configured to perform any suitable laser-beam scans.

In particular embodiments, controller 270 may be configured to receive a feedback signal indicating a position of laser beam 230 relative to solar cell 310 and instruct laser-aiming module 220 to adjust the aiming of laser beam 230 based on the feedback signal. As an example and not by way of limitation, adjusting the aiming of laser beam 230 may allow laser beam 230 to follow the motion of UAV 300 as it flies along its flight path as well as to correct for random beam deviations (e.g., beam deviations caused by air turbulence). In particular embodiments, a feedback signal indicating a position of laser beam 230 relative to solar cell 310 may include a wireless signal sent from UAV 300 to laser system 200. In particular embodiments, a feedback signal may indicate an amount of voltage, current, or electrical power produced by solar cell 310 from laser beam 230. As an example and not by way of limitation, when laser beam 230 is optimally aligned onto solar cell 310, the solar cell 310 may produce approximately 15 amps of current, and if laser beam 230 gradually moves out of alignment with solar cell 310, the electrical current produced by solar cell 310 may also gradually decrease. Controller 270 may receive periodic updates from communications module 360 indicating how much current is being produced by solar cell 310, and based on that information, controller 270 may instruct laser-aiming module 220 to adjust the aiming of laser beam 230 to ensure that the amount of current produced by solar cell 310 is maximized. As an example and not by way of limitation, the aiming of laser beam 230 may be adjusted so that the amount of current produced by solar cell 310 is within a particular percentage of a maximum current (e.g., within 5%, 10%, 20%, or within any suitable percentage of a maximum current). In particular embodiments, the aiming of laser beam 230 may be adjusted along two angular directions (e.g., an azimuthal angle and an inclination or polar angle) based on a feedback signal indicating a position of laser beam 230 relative to solar cell 310. Although this disclosure describes and illustrates particular feedback signals indicating particular information associated with laser-beam aiming, this disclosure contemplates any suitable feedback signals indicating any suitable information associated with laser-beam aiming.

In particular embodiments, laser-aiming module 220 may be configured to dither the aiming of laser beam 230. As an example and not by way of limitation, dithering the aiming of laser beam 230 may refer to laser-aiming module 220 mechanically modulating the orientation of a mirror to cause a corresponding movement or modulation in the aiming of laser beam 230. In particular embodiments, dithering the aiming of laser beam 230 may include applying a particular modulation (e.g., a square-wave, sinusoidal, triangle-wave, or sawtooth-wave modulation) to the orientation of laser beam 230, where the modulation has a particular frequency and amplitude. As an example and not by way of limitation, laser beam 230 may be dithered by applying a sinusoidal modulation to the aiming of laser beam 230, where the aiming modulation has a frequency of approximately 100 Hz and an amplitude of approximately 1-5 microradians. In particular embodiments, the aiming of laser beam 230 may be dithered along two angular directions (e.g., along an azimuthal angle and along an inclination or polar angle). As an example and not by way of limitation, laser beam 230 may first be dithered along an azimuthal angle and then dithered along an inclination angle. As another example and not by way of limitation, laser beam 230 may be dithered along two angular directions at the same time (e.g., dithered at 70 Hz along an azimuthal angle and dithered at 110 Hz along an inclination angle). By dithering at two different frequencies, information about the aiming of laser beam 230 with respect to each of the two angular directions may be extracted from one signal.

In particular embodiments, a feedback signal indicating a position of laser beam 230 relative to solar cell 310 may include information corresponding to an amount of modulation of a voltage, current, or electrical power exhibited by solar cell 310 in response to dithering of the aiming of laser beam 230. In particular embodiments, power controller 340 may determine an amplitude or a phase of a modulation or variation in current produced by solar cell 310. Based on an amplitude or phase of the solar-cell current variation resulting from dithering the aiming of laser beam 230, UAV 300 or controller 270 may determine an amount and a direction by which laser beam 230 is misaligned with respect to solar cell 310. As an example and not by way of limitation, if the aiming of laser beam 230 is dithered approximately along a longitudinal axis of UAV 300, then controller 270 may instruct laser-aiming module 220 to move the aiming of laser beam 230 toward the nose or the tail of UAV 300 based on the phase of the solar-cell current variation with respect to the phase of the laser-beam dithering. Similarly, if the aiming of laser beam 230 is dithered approximately along a transverse axis of UAV 300, then the aiming of the laser beam 230 may be adjusted along the transverse axis based on a phase of the solar-cell current variation with respect to the phase of the laser-beam dithering. Although this disclosure describes and illustrates particular dithering techniques that produce particular feedback signals, this disclosure contemplates any suitable dithering techniques that produce any suitable feedback signals.

In particular embodiments, solar cell 310 may be one of multiple lower solar cells 310 on UAV 300, and a feedback signal indicating a position of laser beam 230 relative to the lower solar cells 310 may include information corresponding to a relative amount of voltage, current, or electrical power produced by each of the lower solar cells. As an example and not by way of limitation, UAV 300 may have four lower solar cells 310 arranged in a quadrant configuration. Communications module 360 may send to controller 270 information corresponding to an amount of current (or a relative amount of current) being produced by each of the four lower solar cells 310. If each of the four solar cells 310 produces approximately the same amount of current, then laser beam 230 may be correctly aimed at an approximate center of the solar cells 310. If one or more of the four solar cells 310 produces a different amount of current, then the aiming of laser beam 230 may be adjusted accordingly. As an example and not by way of limitation, if one solar cell 310 is producing 10 amps of current, and the other three solar cells 310 are each producing approximately 2 amps of current, then the aiming of laser beam 230 may be adjusted so that each solar cell 310 produces approximately 4 amps of current. In particular embodiments, controller 270 may receive periodic updates on the relative amount of current produced by multiple lower solar cells 310, and controller 270 may instruct laser-aiming module 220 to adjust the aiming to ensure that laser beam 230 is approximately centered with respect to the lower solar cells 310. Although this disclosure describes and illustrates particular feedback signals based on particular arrangements of particular numbers of solar cells, this disclosure contemplates any suitable feedback signals based on any suitable arrangements of any suitable numbers of solar cells.

In particular embodiments, laser system 200 may include camera 250. As an example and not by way of limitation, laser system 200 may include a digital camera 250 configured to capture digital images or video, and digital camera 250 may include camera lens 260. In particular embodiments, camera lens 260 (which may be referred to as telescope 260) may be configured to capture light from UAV 300 (including light from laser beam 230 scattered by UAV 300) and focus the captured light onto an image sensor of camera 250. As an example and not by way of limitation, camera 250 may have an image sensor based on charge-coupled device (CCD) technology or based on complementary metal-oxide-semiconductor (CMOS) technology. In particular embodiments, camera lens 260 may be combined with laser-aiming module 220, or camera lens 260 may be a separate optical device. In particular embodiments, camera 250 may be configured to capture visible light, near-infrared light, or a combination of visible and near-infrared light. As an example and not by way of limitation, laser beam 230 may have a wavelength of approximately 1 µm, and camera 250 may have an image sensor configured to capture near-infrared light, including light with a one-micron wavelength. In particular embodiments, camera 250 or lens 260 may be configured to move or rotate to follow UAV 300 as it flies along a flight path. In particular embodiments, camera 250 may be configured to capture images of UAV 300 at particular time intervals (e.g., every 0.01 seconds, 0.1 seconds, 1 second, or at any suitable interval of time). Although this disclosure describes and illustrates particular laser systems that include particular cameras, this disclosure contemplates any suitable laser systems that include any suitable cameras.

In particular embodiments, camera 250 may capture an image or video that shows solar cell 310 and laser beam 230 incident on solar cell 310. As an example and not by way of limitation, camera 250 may be configured to capture an image of UAV 300, where the captured image includes one or more lower solar cells 310 attached to UAV 300 and at least a portion of laser spot 240. In particular embodiments, camera 250 may capture an image or video that shows at least a portion of laser beam 230 incident on solar cell 310. As an example and not by way of limitation, camera 250 may operate at nighttime when there is little ambient light present, and most of the light from UAV 300 captured by camera 250 may be light from laser beam 230 that is scattered by UAV 300.

In particular embodiments, a feedback signal indicating a position of laser beam 230 relative to solar cell 310 may include an image or video captured by camera 250. As an example and not by way of limitation, controller 270 may receive an image captured by camera 250, where the image shows at least a portion of laser beam 230 incident on solar cell 310 or incident on another part of UAV 300. Additionally, the captured image may show solar cell 310 or other parts of UAV 300. Based on the received image, controller 270 may send instructions to laser-aiming module 220 to adjust the aiming of laser beam 230. In particular embodiments, adjusting the aiming of laser beam 230 may act to maintain or increase an amount of laser spot 240 that is incident on solar cell 310. As an example and not by way of limitation, an image received from camera 250 may show solar cell 310 illuminated by 60% of laser spot 240 with the remaining 40% of laser spot 240 not incident on solar cell 310 (e.g., the 40% of laser spot 240 may be incident on another part of UAV 300 or may miss UAV 300 and continue to propagate upwards). Based on the received image, controller 270 may instruct laser-aiming module 220 to adjust the aiming of laser beam 230 to increase the percentage of laser spot 240 incident on solar cell 310. In particular embodiments, a process of receiving images from camera 250 and adjusting the aiming of laser beam 230 based on the received images may continue as long as laser 210 is active (e.g., the process may operate continuously at nighttime while laser beam 230 supplies power to solar cell 310).

In particular embodiments, UAV 300 may include one or more retroreflectors to reflect a portion of light from laser beam 230 back towards laser system 200. As an example and not by way of limitation, a retroreflector may be located near a center of solar cell 310, or solar cell 310 may have two or more retroreflectors located around the perimeter of solar cell 310. Camera 250 may capture an image with light from laser beam 230 reflected by the retroreflectors, and the reflected light may provide feedback information for adjusting the aiming of laser beam 230. As an example and not by way of limitation, solar cell 310 may have one central retroreflector located near its center and three or more retroreflectors located around its perimeter. Camera 250 may capture light from one or more of the retroreflectors, and the aiming of laser beam 230 may be adjusted to maximize the amount of light reflected by the central retroreflector. Additionally, the aiming of laser beam 230 may be adjusted so that the light reflected by each of the perimeter retroreflectors is minimized or is approximately equal. Although this disclosure describes and illustrates particular feedback signals based on particular captured images, this disclosure contemplates any suitable feedback signals based on any suitable captured images.

In particular embodiments, laser-aiming module 220 may be configured to perform a conical scan of laser beam 230 while camera 250 captures images showing solar cell 310. As an example and not by way of limitation, when laser 210 is initially activated or laser beam 230 becomes misaligned, a conical scan may be performed to aim laser beam 230 at solar cell 310. During a conical scan, controller 270 may receive images from camera 250 and determine whether laser beam 230 is incident on solar cell 310. When an image is captured that shows at least part of laser beam 230 incident on solar cell 310, controller 270 may cancel the conical scan and instruct laser-aiming module 230 to aim laser beam 230 based at least in part on the captured image showing laser beam 230 incident on solar cell 310.

In particular embodiments, laser system 200 may be configured to produce multiple laser beams 230 and aim each of the laser beams 230 at UAV 300. As an example and not by way of limitation, laser system 200 may produce three laser beams 230, and each laser beam 230 may be aimed at one solar cell 310. As another example and not by way of limitation, UAV 300 may have three distinct lower solar cells 310, and laser system 200 may produce three laser beams 230, each laser beam 230 configured to illuminate one of the solar cells 310. In particular embodiments, each laser beam 230 may have a laser-aiming module 220, and each laser-aiming module may receive aiming instructions from controller 270. As an example and not by way of limitation, laser system 200 may include one camera 250 configured to capture an image that shows each lower solar cell 310 (or retroreflectors associated with the solar cells 310), and based on the captured image, controller 270 may instruct each laser-aiming module 220 to adjust the aiming of its associated laser beam 230. In particular embodiments, the aiming of each laser beam 230 of a multi-beam laser system 200 may be closely related since each laser beam 230 may experience similar atmospheric effects (e.g., air turbulence) while propagating to UAV 300. In particular embodiments, a multi-beam laser system 200 may reduce the intensity of the laser beams 230 by spreading the laser power out over a larger area. In particular embodiments, a multi-beam laser system 200 may result in an increase in reliability or efficiency of power transfer to UAV 300. Although this disclosure describes particular multi-beam laser systems having particular configurations of laser beams and solar cells, this disclosure contemplates any suitable multi-beam laser systems having any suitable configurations of laser beams and solar cells.

Figure 3:
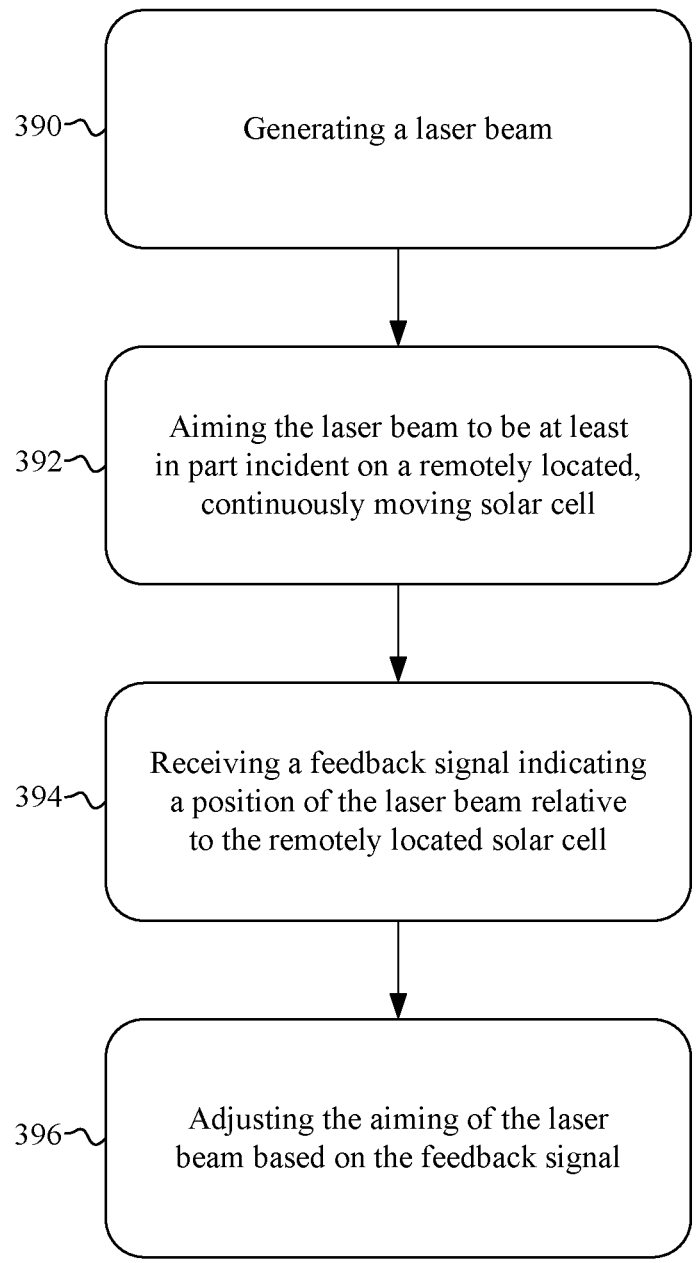
FIG. 3 illustrates an example method for aiming a laser beam at a remotely located solar cell.

FIG. 3 illustrates an example method 380 for aiming a laser beam 230 at a remotely located solar cell 310. In particular embodiments, the method of FIG. 3 may be used to remotely supply power to an unmanned aerial vehicle 300. The method may begin at step 390, where a laser beam 230 may be generated. As an example and not by way of limitation, a laser 210 may generate laser beam 230. At step 392, the laser beam 230 may be aimed to be at least in part incident on a remotely located, continuously moving solar cell 310. As an example and not by way of limitation, a laser-aiming module 220 may aim the laser beam 230. At step 394, a feedback signal may be received, the feedback signal indicating a position of the laser beam 230 relative to the remotely located solar cell 310. As an example and not by way of limitation, the feedback signal may include a wireless signal sent from UAV 300 to laser system 200 or an image of a portion of UAV 300 captured by a camera 250. At step 396, the aiming of the laser beam 230 may be adjusted based on the feedback signal. As an example and not by way of limitation, a controller 270 of laser system 200 may instruct laser-aiming module 220 to adjust the aiming of the laser beam 230. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for aiming a laser beam at a remotely located solar cell including the particular steps of the method of FIG. 3, this disclosure contemplates any suitable method for aiming a laser beam at a remotely located solar cell including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
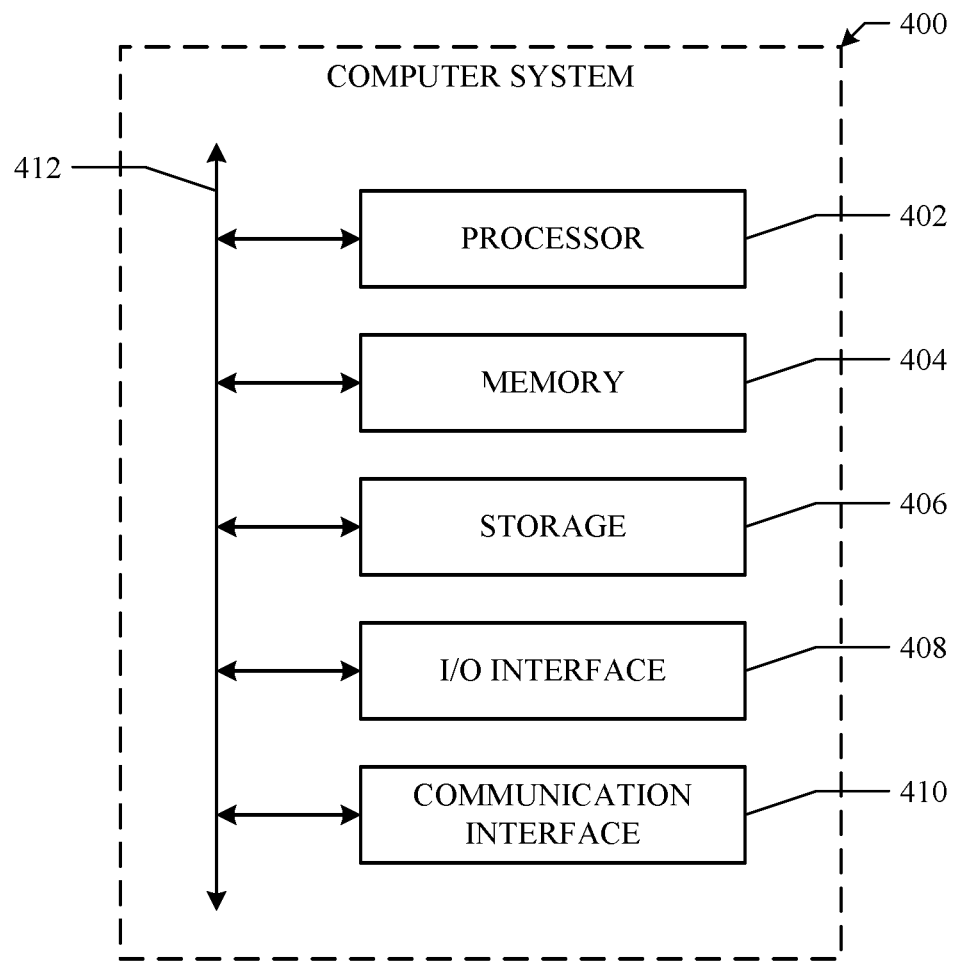
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
a laser configured to generate a laser beam;
a laser-aiming module configured to aim the laser beam to be at least in part incident on a remotely located, continuously moving solar cell; and
a controller configured to:
receive a feedback signal indicating a position of the laser beam relative to the remotely located, continuously moving solar cell, wherein the feedback signal indicates an amount of voltage, current, or electrical power produced by the remotely located, continuously moving solar cell from the laser beam; and
if the voltage, current, or electrical power produced falls below a threshold value, instruct the laser-aiming module to adjust the aiming of the laser beam based on the feedback signal.

2. The system of claim 1, wherein the laser has a wavelength within a range of approximately 0.5 μm to approximately 2.0 μm.

3. The system of claim 1, wherein the laser has an average output optical power within a range of approximately 500 watts to approximately 10,000 watts.

4. The system of claim 1, wherein the solar cell is part of an unmanned aerial vehicle configured to fly at an altitude within a range of approximately 40,000 feet to approximately 80,000 feet above sea level.

5. The system of claim 1, wherein the solar cell produces electrical power from the laser beam incident on the solar cell.

6. The system of claim 1, wherein a diameter of the laser beam incident on the solar cell is approximately equal to a length or a width of the solar cell.

7. The system of claim 1, wherein the laser-aiming module is further configured to adjust a size or a shape of the laser beam incident on the solar cell to substantially match a size or a shape of the solar cell.

8. The system of claim 1, wherein the laser-aiming module comprises a telescope or a reflector and adjusting the aiming of the laser beam comprises moving or rotating at least a portion of the telescope or the reflector.

9. The system of claim 1, wherein:
the solar cell is part of an unmanned aerial vehicle (UAV);
the feedback signal comprises a wireless signal sent from the UAV to the system; and
the position of the laser beam relative to the solar cell is indicated by an amount of voltage, current, or electrical power produced by the solar cell from the laser beam.

10. The system of claim 1, wherein the system further comprises a camera and the feedback signal comprises an image or a video captured by the camera, the image or video showing the solar cell and the laser beam incident on the solar cell.

11. The system of claim 1, wherein:
the laser-aiming module is further configured to dither the aiming of the laser beam;
the solar cell is part of an unmanned aerial vehicle (UAV);
the feedback signal comprises a wireless signal sent from the UAV to the system; and
the wireless signal comprises information corresponding to an amount of modulation of a voltage, current, or electrical power exhibited by the solar cell in response to the dithering of the aiming of the laser beam.

12. The system of claim 1, wherein:
the solar cell is one of a plurality of solar cells on an unmanned aerial vehicle.

13. The system of claim 1, wherein the solar cell is part of an unmanned aerial vehicle (UAV) and the controller is further configured to adjust the aiming of the laser beam based on an altitude or a flight path of the UAV.

14. The system of claim 1, wherein the laser-aiming module is further configured to perform a conical scan of the laser beam to initially aim the laser beam at the solar cell.

15. The system of claim 1, further comprising an unmanned aerial vehicle (UAV), wherein the solar cell is part of a lower solar cell attached to a downward-facing surface of the UAV, wherein the UAV comprises:
a propulsion system configured to maintain the UAV aloft;
a communications module configured to wirelessly communicate with the controller;
a rechargeable battery configured to provide operating power to the propulsion system and the communications module;
an upper solar cell attached to an upward-facing surface of the UAV and configured to receive sunlight and produce solar-based electrical power from the received sunlight;
the lower solar cell configured to receive optical power from the laser beam and produce supplemental electrical power from the received optical power; and
a power controller configured to:
provide the solar-based electrical power to the UAV, comprising charge the rechargeable battery with the solar-based electrical power, provide the solar-based electrical power to the propulsion system, or provide the solar-based electrical power to the communications module; and
provide the supplemental electrical power to the UAV, comprising charge the rechargeable battery with the supplemental electrical power, provide the supplemental electrical power to the propulsion system, or provide the supplemental electrical power to the communications module.

16. A method comprising:
generating a laser beam;
aiming the laser beam to be at least in part incident on a remotely located, continuously moving solar cell;
receiving a feedback signal indicating a position of the laser beam relative to the remotely located solar cell, wherein the feedback signal indicates an amount of voltage, current, or electrical power produced by the remotely located, continuously moving solar cell from the laser beam; and
if the voltage, current, or electrical power produced falls below a threshold value, adjusting the aiming of the laser beam based on the feedback signal.

17. The method of claim 16, wherein:
the solar cell is part of an unmanned aerial vehicle (UAV);
the feedback signal comprises a wireless signal sent from the UAV; and
the position of the laser beam relative to the solar cell is indicated by an amount of voltage, current, or electrical power produced by the solar cell from the laser beam.

18. The method of claim 17, wherein the feedback signal comprises an image or a video captured by a camera, the image or video showing the solar cell and the laser beam incident on the solar cell.

19. The method of claim 17, further comprising dithering the aiming of the laser beam, wherein:
the solar cell is part of an unmanned aerial vehicle (UAV);
the feedback signal comprises a wireless signal sent from the UAV to the system; and
the wireless signal comprises information corresponding to an amount of modulation of a voltage, current, or electrical power exhibited by the solar cell in response to the dithering of the aiming of the laser beam.

20. A system comprising:
means for generating a laser beam;
means for aiming the laser beam to be at least in part incident on a remotely located, continuously moving solar cell;
means for receiving a feedback signal indicating a position of the laser beam relative to the remotely located solar cell, wherein the feedback signal indicates an amount of voltage, current, or electrical power produced by the remotely located, continuously moving solar cell from the laser beam; and
means for, if the voltage, current, or electrical power produced falls below a threshold value, then adjusting the aiming of the laser beam based on the feedback signal.

* * * * *